United States Patent [19]

Draskovich

[11] Patent Number: 5,047,264

[45] Date of Patent: Sep. 10, 1991

[54] METHOD OF DYNAMICALLY BALANCING CERAMIC TURBINE WHEELS

[75] Inventor: Barry S. Draskovich, Mesa, Ariz.

[73] Assignee: Allied-Signal Inc., Morris Township, Morris County, N.J.

[21] Appl. No.: 357,577

[22] Filed: May 26, 1989

[51] Int. Cl.⁵ .......................... B05D 3/12; B05D 5/00
[52] U.S. Cl. ..................... 427/277; 427/279; 427/287
[58] Field of Search ............ 427/264, 266, 397.8, 427/277, 279, 287; 106/600; 51/169; 74/573 R; 416/144; 156/75

[56] References Cited

U.S. PATENT DOCUMENTS

| | | | |
|---|---|---|---|
| 1,975,053 | 9/1934 | Simonds | 51/293 |
| 2,193,734 | 3/1940 | MacCracken | 156/75 |
| 2,336,697 | 12/1943 | Moeller | 416/144 |
| 2,432,659 | 12/1947 | Criswell | 118/669 |
| 3,323,597 | 6/1967 | Longobardi et al. | 416/144 |
| 3,506,478 | 4/1970 | Hudson et al. | 427/8 |
| 3,939,020 | 2/1976 | Caramanian et al. | 156/64 |
| 3,951,673 | 4/1976 | Isohata et al. | 106/600 X |
| 4,083,735 | 4/1978 | Caramanian | 156/64 |
| 4,429,003 | 1/1984 | Fredriksson et al. | 428/317.9 |
| 4,817,455 | 4/1989 | Buxe | 74/573 R |

FOREIGN PATENT DOCUMENTS

| | | | |
|---|---|---|---|
| 59-110942 | 6/1984 | Japan | 74/573 B |
| 2119063 | 11/1983 | United Kingdom | 74/573 B |

*Primary Examiner*—Evan Lawrence
*Attorney, Agent, or Firm*—R. Steven Linne; James W. McFarland; Robert A. Walsh

[57] ABSTRACT

Ceramic turbine wheels are balanced to minimize rotational vibrations by bonding silica-based glass pads to the wheel. The pads are formed from a mixture of sodium silicate, water and a fine ceramic powder, preferably of a composition similar to the underlying ceramic turbine wheel. The weighted pads are machined, without damage to the underlying ceramic wheel, to achieve proper balance.

7 Claims, 1 Drawing Sheet

5,047,264

METHOD OF DYNAMICALLY BALANCING CERAMIC TURBINE WHEELS

CROSS-REFERENCE TO RELATED APPLICATION

This application is related to application Ser. No. 186,275, filed Apr. 26, 1988, now U.S. Pat. No. 5,006,423 which is also assigned to the assignee of the present invention.

TECHNICAL FIELD

This present invention relates generally to non-metallic gas turbine engine components and more specifically to methods and apparatus for balancing monolithic ceramic and ceramic composite gas turbine engine wheels to minimize vibration at high rotational velocities.

BACKGROUND OF THE INVENTION

Small, high performance gas turbine engines typically have large disk shaped components which rotate at a high rate of speed. For example, turbine and compressor wheels may rotate up to 50,000 RPM. Dynamic unbalance of such components leads to severe vibration which reduces the useful life of not only the components but also of the surrounding support structure.

The present method of spin balancing metallic compressor and turbine wheels involve selective removal of material from a portion of the central disk area in order to equalize, as much as possible, the rotating mass, and therefore the centrifugal forces, on diametrically opposite portions of the wheel.

However, with the recent development of high temperature ceramic turbine wheels, such methods are no longer satisfactory. Such advanced turbine wheels are being developed using silicon nitride, silicon carbide, and silicon carbide coated carbon-carbon composites which are all very brittle and sensitive to surface cracks. Therefore, any balancing method must avoid the formation of strength limiting cracks, especially in the critical central disk area. In addition, the thin coatings on composite disks cannot be ground away without loss of the coating's primary function of oxidation protection.

In view of the foregoing, it should be apparent that there is an unmet need in this art for improvements in the dynamic balancing of ceramic turbine components.

It is therefore an object of the present invention to provide a simple and inexpensive method to spin balance ceramic turbine wheels without removal of critical structural material.

SUMMARY OF THE INVENTION

The present invention aims to overcome the disadvantages of the prior art as well as offer certain other advantages by providing a novel refractory loaded, silica-based glass pad bonded to a ceramic turbine wheel. The mass of the glass pad may be adjusted as required to balance the wheel by adding or removing material without affecting the underlying ceramic.

The glass pad is formed from a mixture of sodium silicate in water (i.e. water glass) and a silica containing ceramic powder, preferably of a composition similar to the underlying ceramic. This mixture has been found to be compatible with, and strongly adherent to, most silica containing ceramic turbine materials such as $Si_3N_4$, SiC, and SiC coated C—C composites. It is believed that the mixture forms a complex chemical bond to the ceramic. The mixture is easily applied as a paste but when cured is structurally strong and thermally stable at the high operating temperatures typical of advanced gas turbine engines, i.e. up to at least 2500° F. The ceramic powder in the mixture inhibits propagation of any surface cracks formed by machining or sanding away of excess material.

BRIEF DESCRIPTION OF THE DRAWINGS

While this specification concludes with claims particularly pointing out and distinctly claiming the subject matter which is regarded as the invention, it is believed that the objects, features, and advantages thereof may be better understood from the following detailed description of a presently preferred embodiment when taken in connection with the accompanying drawing in which:

BEST MODE FOR CARRYING OUT THE INVENTION

Figure 1:
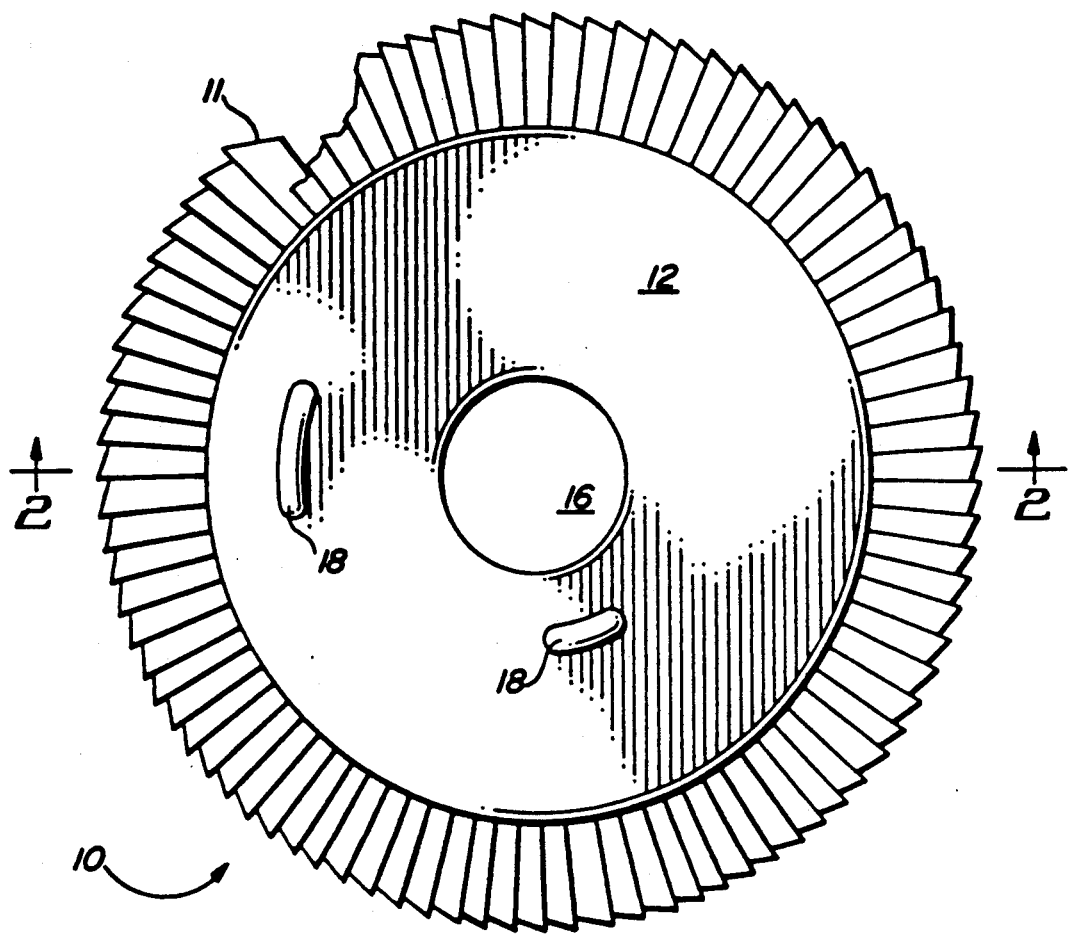
FIG. 1 is an illustration of typical glass-balancing pads bonded to a ceramic turbine wheel.
Figure 2:
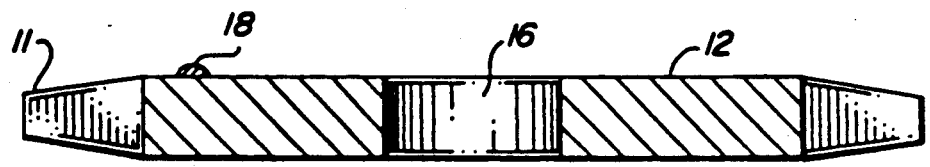
FIG. 2 is a cross-sectional view of the wheel along the lines 2—2 of FIG. 1.

As illustrated in FIG. 1, the turbine wheel or other ceramic component 10 has a central bore 16 (or sometimes a stub shaft, not shown) for connection within a gas turbine engine: a generally flat, disk shaped region 12; a plurality of airfoil shaped blades 11 along the outer circumference of the disk; and one or more balancing pads 18 bonded to the disk surface in order to reduce rotational vibration. The proper placement and weight of the pads 18 may be determined by methods well known in the art. For example, the wheel may be spun at high speed and the location and amount of unbalance measured. It is preferable to place the pads 18 on the flat disk region 12 of the wheel 10. However, the high temperature stability of the glass allows the pads to be placed relatively close to the hot turbine blades 11 so that less balancing weight is needed than if placed near the bore 16.

The composition of the underlying ceramic in the tests described below was silicon carbide but any silica-forming material may be used including $SiO_2$, $Si_3N_4$, SiC composites, SiC coated carbon-carbon composite, etc. or most other high temperature materials having silicon in the surface layers.

The glass pads 18 are prepared by thoroughly mixing about equal parts, by weight, of a ceramic (silicon carbide) powder, preferably 325 mesh size, with sodium-silicate solution. The ceramic powder should be similar to the underlying component composition for best results. That is, substitute silicon nitride powder when forming pads on $Si_3N_4$ turbine wheels. However, since many $Si_3N_4$ components have a relatively high aluminum content from use of densification aids, alumina powder may also be used with acceptable results. The resulting alumino-silicate glass will bond to the alumina-containing, silica surface layer formed on the silicon nitride component.

To form the balancing pads 18 on the ceramic wheel 10, the placement area is cleaned, for example with acetone or alcohol, and dried. A thin layer of the liquid glass mixture is then applied and allowed to solidify. Drying may be hastened by exposure to warm air (e.g. placed in a 200° F. oven) for a short time (e.g. about 5 or 10 minutes). After this base coat is cured, additional layers are applied and cured until at least the calculated amount of mass has been added to the wheel 10. Preferably, the finished wheel 10 is cured at 200° F. for at least 15 minutes.

Typically, more than sufficient mass is added to the wheel so that some excess must be removed to achieve proper balance. The cured pads 18 may easily be machined or sanded away without damage to the wheel 10.

In order to verify the efficacy of this attachment method, numerous laboratory evaluations were performed. These included temperature capability tests with small specimens and spin tests on larger components. All evaluations were considered successful and two representative tests are briefly described below:

1) a thin pad was successfully bonded to a sintered, alpha silicon carbide test bar. This specimen was continuously thermal cycled between room temperature and a high test temperature between about 1600° F. and 2200° F. No joint failure was observed indicating good thermal shock and oxidation resistance of the pad material; and 2) 18 pads were arranged at various locations on a 2.5 inch diameter sintered, alpha-silicon carbide disk. This disk was spun to 50,000 rpm. The outermost joints were thereby exposed to an acceleration force of 177,378 g's, with only one joint failure occurring, indicating good bond strength.

While in order to comply with the statute, this invention has been described in terms more or less specific to one preferred embodiment, it is expected that various alterations, modifications, or permutations thereof will be apparent to those skilled in the art. Therefore, it should be understood that the invention is not to be limited to the specific features shown or described but it is intended that all equivalents be embraced within the spirit and scope of the invention as defined by the appended claims.

What is claimed is:

1. A method of balancing a silicon-containing ceramic wheel for use in a gas turbine engine comprising the steps of:
predetermining the location and amount of additional mass needed to balance said wheel;
preparing a mixture of fine ceramic powder and sodium silicate solution, said fine ceramic powder having substantially the same composition as the surface of said ceramic wheel;
applying a thin layer of said mixture to the wheel at said predetermined location;
allowing said mixture to solidify;
applying sufficient additional layers of said mixture to add about said predetermined amount of additional mass to the wheel; and
curing said mixture before using said wheel in a gas turbine engine.

2. The method of claim 1 wherein said wheel is selected from the group consisting of silicon carbide and silicon carbide coated carbon-carbon composites and said fine ceramic powder is 325 mesh size silicon carbide powder.

3. The method of claim 1 wherein said mixture comprises about equal parts by weight of said fine ceramic powder and said sodium silicate solution.

4. A method of balancing a silicon nitride ceramic wheel for use in a gas turbine engine comprising the steps of:
predetermining the location and amount of additional mass needed to balance said wheel;
preparing a mixture of fine ceramic powder and sodium silicate solution, said powder selected from the group consisting of alumina, silicon nitride and mixtures thereof;
applying a thin layer of said mixture to the wheel at said predetermined location;
allowing said mixture to solidify;
applying sufficient additional layers of said mixture to add about said predetermined amount of additional mass to the wheel; and
curing said mixture before using said wheel in a gas turbine engine.

5. A method of balancing a silicon-containing ceramic wheel for use in a gas turbine engine comprising the steps of:
predetermining the location and amount of additional mass needed to balance said wheel;
preparing a mixture of fine ceramic powder and sodium silicate solution;
applying a thin layer of said mixture to the wheel at said predetermined location;
allowing said mixture to solidify;
applying sufficient additional layers of said mixture to add about said predetermined amount of additional mass to the wheel;
curing said mixture before using said wheel in a gas turbine engine; and
adding more than sufficient mass of mixture to balance the wheel, then after curing the mixture, machining away the excess mass of mixture to balance the wheel.

6. A method of balancing a silicon-containing ceramic turbine wheel which comprises applying to the wheel a balancing composition consisting essentially of a fine powder of said ceramic in a sodium silicate solution, curing the composition to a solid mass, and adjusting the amount of balancing composition on the wheel to achieve the desired dynamic balance, said ceramic being silicon carbide and said balancing composition being about equal parts by weight of 325 mesh size silicon carbide powder and sodium silicate.

7. A method of balancing a silicon-containing ceramic turbine wheel which comprises applying to the wheel a balancing composition consisting essentially of a fine powder of said ceramic in a sodium silicate solution, curing the composition to a solid mass, and adjusting the amount of balancing composition on the wheel to achieve the desired dynamic balance, said ceramic being silicon nitride and said balancing composition being a fine silicon nitride powder in a sodium silicate solution.

* * * * *